(12) United States Patent
Sasaki et al.

(10) Patent No.: US 10,199,170 B2
(45) Date of Patent: Feb. 5, 2019

(54) MULTILAYER CERAMIC CAPACITOR

(71) Applicant: TAIYO YUDEN CO., LTD., Taito-ku, Tokyo (JP)

(72) Inventors: Takashi Sasaki, Takasaki (JP); Toshiya Kuji, Takasaki (JP); Shota Yajima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/605,781

(22) Filed: May 25, 2017

(65) Prior Publication Data

US 2017/0345572 A1    Nov. 30, 2017

(30) Foreign Application Priority Data

May 30, 2016  (JP) .................. 2016-107068

(51) Int. Cl.
  *H01G 4/30*   (2006.01)
  *H01G 4/232*  (2006.01)
  *H01G 4/252*  (2006.01)
  *H01G 4/005*  (2006.01)
  *H01G 4/12*   (2006.01)
  *H01G 4/248*  (2006.01)

(52) U.S. Cl.
  CPC .............. *H01G 4/30* (2013.01); *H01G 4/005* (2013.01); *H01G 4/12* (2013.01); *H01G 4/248* (2013.01)

(58) Field of Classification Search
  CPC .......... H01G 4/30; H01G 4/232; H01G 4/252; H01G 4/005
  USPC ............ 361/321.1, 301.4, 306.1, 306.3, 309, 361/301.1
  See application file for complete search history.

(56) References Cited

U.S. PATENT DOCUMENTS

2006/0126264 A1*  6/2006  Yoshii ................... H01G 4/232
                                              361/301.1

FOREIGN PATENT DOCUMENTS

JP    2009027148 A    2/2009
JP    2015228481 A    12/2015

* cited by examiner

*Primary Examiner* — Eric Thomas
*Assistant Examiner* — Arun Ramaswamy
(74) *Attorney, Agent, or Firm* — Law Office of Katsuhiro Arai

(57) ABSTRACT

In an embodiment, a multilayer ceramic capacitor 20 has a first external electrode 22 having a second part 22*b*, and a second external electrode 23 having a second part 23*b*, and each second part have an external shape where length L21 becomes the largest at a width-direction center portion 22*b*1 or 23*b*1 and length L22 becomes the smallest at a width-direction edge 22*b*3 or 23*b*3, with the length decreasing gradually from the width-direction center portion 22*b*1 or 23*b*1 to the width-direction edge 22*b*3 or 23*b*3.

18 Claims, 9 Drawing Sheets

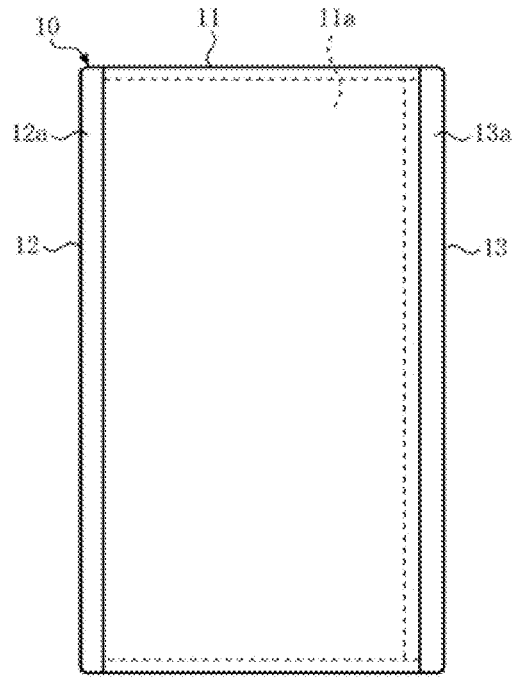
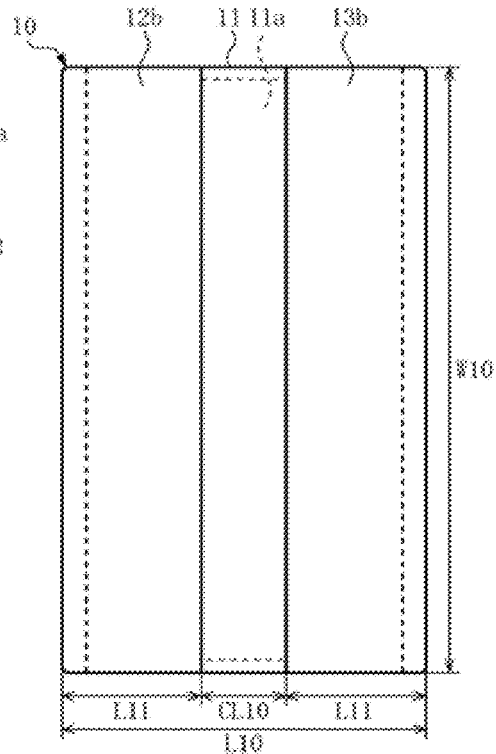
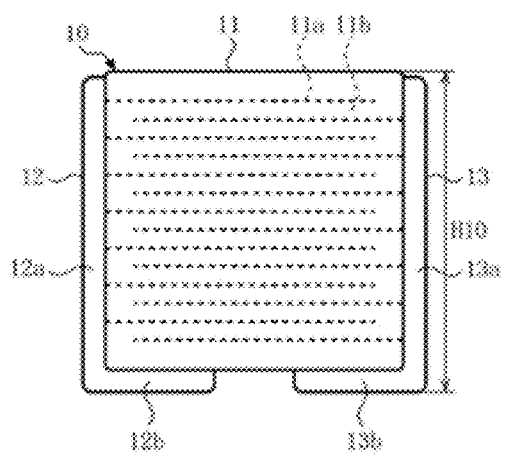

MULTILAYER CERAMIC CAPACITOR

BACKGROUND

Field of the Invention

The present invention relates to a multilayer ceramic capacitor satisfying the relationship of "width>length," while also having external electrodes that are each embodied as a continuous unit whose first part is attached to a length-direction face (i.e., one length-direction face and the other length-direction face, respectively) and whose second part is attached to at least one height-direction face, of a capacitor body.

Description of the Related Art

Multilayer ceramic capacitors whose dimensions are defined in terms of length, width, and height generally satisfy the relationship of "length>width," while having external electrodes at their two length-direction ends. On the other hand, LW-reversed multilayer ceramic capacitors satisfying the relationship of "width>length" are known, which are designed to reduce the ESL (equivalent series inductance) (refer to Patent Literature 1, for example). Also known are external electrodes that are each embodied as a continuous unit whose first part is attached to one length-direction face and the other length-direction face, and whose second part is attached to one height-direction face, of a capacitor body, in order to make the height of the multilayer ceramic capacitor small (refer to Patent Literature 2, for example).

Now, the constitution of a multilayer ceramic capacitor satisfying the relationship of "width>length," while also having external electrodes that are each embodied as a continuous unit whose first part is attached to one length-direction face and the other length-direction face, and whose second part is attached to one height-direction face, of a capacitor body, is explained using FIGS. 1A to 1C, as a comparative example of the multilayer ceramic capacitor 20 explained later in the section entitled [Detailed Description of Embodiments]. In this explanation, the dimensions of the multilayer ceramic capacitor along its length, width, and height directions are denoted as length, width, and height, respectively.

The multilayer ceramic capacitor 10 of length L10, width W10 and height H10, as shown in FIGS. 1A to 1C, satisfies the relationship of "width W10>length L10>height H10." This multilayer ceramic capacitor 10 has a capacitor body 11 of roughly rectangular solid shape, as well as a first external electrode 12 and a second external electrode 13, respectively provided at the two length-direction ends of the capacitor body 11. The capacitor body 11 has a capacitive part constituted by multiple internal electrode layers 11a that are stacked with dielectric layers 11b in between, as well as dielectric margin parts covering both width-direction sides and both height-direction sides of the capacitive part. The ends of the multiple internal electrode layers 11a are connected alternately to the first external electrode 12, and to the second external electrode 13, in the height direction. The first external electrode 12 is embodied as a continuous unit whose first part 12a is attached to one length-direction face (left face in FIG. 1C), and whose second part 12b is attached to one height-direction face (bottom face in FIG. 1C), of the capacitor body 11. The second external electrode 13 is embodied as a continuous unit whose first part 13a is attached to the other length-direction face (right face in FIG. 1C), and whose second part 13b is attached to one height-direction face (bottom face in FIG. 1C), of the capacitor body 11.

Incidentally, since the multilayer ceramic capacitor 10 shown in FIGS. 1A to 1C satisfies the relationship of "width W10>length L10" and also has the first external electrode 12 and second external electrode 13 at the two length-direction ends, respectively, it is subject to the startup phenomenon (also called the "Manhattan phenomenon" or "tombstone phenomenon") at a higher probability than is a multilayer ceramic capacitor satisfying the relationship of "length>width," when the capacitor is mounted on a circuit board. Accordingly, the length-direction clearance CL10 between the second part 12b of the first external electrode 12 and the second part 13b of the second external electrode 13 is made shorter than the length L11 of the second parts 12b, 13b by the maximum amount possible, in order to suppress this startup phenomenon.

Next, the condition in which the multilayer ceramic capacitor 10 shown in FIGS. 1A to 1C is mounted on a circuit board, is explained using FIGS. 2 and 3. In FIGS. 2 and 3, CP1 represents a first conductor pad of roughly rectangular shape corresponding to the second part 12b of the first external electrode 12, while CP2 represents a second conductor pad of roughly rectangular shape corresponding to the second part 13b of the second external electrode 13. The length and width of the first conductor pad CP1 are roughly the same as the length L11 and width W10 of the second part 12b of the first external electrode 12 (refer to FIG. 1B), respectively, while the length and width of the second conductor pad CP2 are roughly the same as the length L11 and width W10 of the second part 13b of the second external electrode 13 (refer to FIG. 1B), respectively.

When the multilayer ceramic capacitor 10 shown in FIGS. 1A to 1C is mounted on a circuit board, first, cream solder or other creamy bonding material is applied on the surface of the first conductor pad CP1, and on the surface of the second conductor pad CP2. Next, the multilayer ceramic capacitor 10 is placed on the circuit board in such a way that both the second part 12b of the first external electrode 12, and the second part 13b of the second external electrode 13, contact the creamy bonding material that has been applied. Next, the circuit board on which the multilayer ceramic capacitor 10 has been placed is put in a reflow oven to bond primarily the second part 12b of the first external electrode 12 to the first conductor pad CP1, and bond primarily the second part 13b of the second external electrode 13 to the second conductor pad CP2.

Even if, in the aforementioned placement step, the multilayer ceramic capacitor 10 shifts somewhat in the length direction (refer to +D1 and −D1 in FIG. 2) or width direction (refer to +Dw and −Dw in FIG. 2) from an ideal position, the self-alignment effect in the aforementioned bonding step will cause the multilayer ceramic capacitor 10 to move appropriately in the direction of the arrow shown at the center of FIG. 2, and its position will be automatically corrected to the proper position shown in FIG. 2.

Incidentally, the multilayer ceramic capacitor 10 may shift in a rotational direction (refer to +θ and −θ in FIG. 3) from an ideal position in the placement step, as shown in FIG. 3. Such rotational shift may be caused by, for example, vibration applied to the multilayer ceramic capacitor 10 in the transfer process after the multilayer ceramic capacitor 10 has been picked up with a pickup nozzle for placement, or sliding of the multilayer ceramic capacitor 10 against a pickup nozzle for placement in a state where the multilayer ceramic capacitor 10 is picked up on the pickup nozzle, or surface irregularity in the area of the multilayer ceramic capacitor 10 where the multilayer ceramic capacitor 10 is picked up with a pickup nozzle for placement, among others.

With the multilayer ceramic capacitor 10 shown in FIGS. 1A to 1C, the length-direction clearance CL10 between the second part 12b of the first external electrode 12 and the second part 13b of the second external electrode 13 is made shorter than the length L11 of the second parts 12b, 13b by the maximum amount possible, in order to suppress the startup phenomenon when the capacitor is mounted on a circuit board. A consequence of this is that, as shown in FIG. 3, if the multilayer ceramic capacitor 10 undergoes a rotational shift (in FIG. 3, this rotational shift is approx. 15 degrees) in the placement step, the second part 12b of the first external electrode 12 on the multilayer ceramic capacitor 10 will contact the second conductor pad CP2 and cause a mounting failure. It should be noted that, once the multilayer ceramic capacitor 10 undergoes a rotational shift, like the one shown in FIG. 3, this rotational shift can no longer be corrected by the self-alignment effect in the bonding step.

BACKGROUND ART LITERATURES

[Patent Literature 1] Japanese Patent Laid-open No. 2009-027148
[Patent Literature 2] Japanese Patent Laid-open No. 2015-228481

SUMMARY

The present invention relates to a multilayer ceramic capacitor satisfying the relationship of "width>length," while also having external electrodes that are each embodied as a continuous unit whose first part is attached to one length-direction face and the other length-direction face, and whose second part is attached to at least one height-direction face, of a capacitor body, wherein an object of the present invention is to reduce the probability of this multilayer ceramic capacitor causing a mounting failure as it is placed on a circuit board, even when it undergoes a rotational shift.

Any discussion of problems and solutions involved in the related art including the above discussion has been described in this disclosure solely for the purposes of providing a context for the present invention, and should not be taken as an admission that any or all of the discussion were known at the time the invention was made.

To achieve the aforementioned object, the present invention represents a multilayer ceramic capacitor satisfying the relationship of "width>length," while also having a first external electrode embodied as a continuous unit whose first part is attached to one length-direction face, and whose second part is attached to at least one height-direction face, of a capacitor body, as well as a second external electrode embodied as a continuous unit whose first part is attached to the other length-direction face, and whose second part is attached to one height-direction face, of the capacitor body; wherein, when the dimension along the length direction is denoted as length and the dimension along the width direction is denoted as width, then the second part of the first external electrode, and the second part of the second external electrode, each have an external shape whose length becomes the largest at a width-direction center portion and the smallest at each width-direction edge, with the length decreasing gradually from the width-direction center portion to the width-direction edge.

According to the multilayer ceramic capacitor pertaining to the present invention, the probability of this multilayer ceramic capacitor causing a mounting failure as it is placed on a circuit board, can be reduced, even when it undergoes a rotational shift.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a plan view of a multilayer ceramic capacitor representing a comparative example, FIG. 1B is a bottom view of the multilayer ceramic capacitor shown in FIG. 1A, and FIG. 1C is a side view of the multilayer ceramic capacitor shown in FIG. 1A.

DESCRIPTION OF THE SYMBOLS

20 - - - Multilayer ceramic capacitor, 21 - - - Capacitor body, 21$a$ - - - Internal electrode layer, 21$b$ - - - Dielectric layer, 22 - - - First external electrode, 22$a$ - - - First part of the first external electrode, 22$b$ - - - Second part of the first external electrode, 22$b$1 - - - Width-direction center portion of the second part, 22$b$2 - - - Width-direction end of the second part, 22$b$3 - - - Width-direction edge of the second part, 23 - - - Second external electrode, 23$a$ - - - First part of the second external electrode, 23$b$ - - - Second part of the second external electrode, 23$b$1 - - - Width-direction center portion of the second part, 23$b$2 - - - Width-direction end of the second part, 23$b$3 - - - Width-direction edge of the second part, L20 - - - Length of the multilayer ceramic capacitor, L21 - - - Length of the width-direction center portion of the second part of the first external electrode and that of the width-direction center portion of the second part of the second external electrode, L22 - - - Length of the width-direction edge of the second part of the first external electrode and that of the width-direction edge of the second part of the second external electrode, W20 - - - Width of the multilayer ceramic capacitor, W21 - - - Width of the width-direction center portion of the second part of the first external electrode and that of the width-direction center portion of the second part of the second external electrode, W22 - - - Width of the width-direction end of the second part of the first external electrode and that of the width-direction end of the second part of the second external electrode, CL20 - - - Length-direction clearance between the width-direction center portions of the second parts of the first external electrode and the second external electrode.

DETAILED DESCRIPTION OF EMBODIMENTS

First, the constitution of a multilayer ceramic capacitor to which the present invention is applied, is explained using FIGS. 4A to 5C. In this explanation, the dimensions of the multilayer ceramic capacitor along its length, width, and height directions are denoted as length, width, and height, respectively.

The multilayer ceramic capacitor 20 of length L20, width W20 and height H20, as shown in FIGS. 4A to 5C, satisfies the relationship of "width W20>length L20>height H20." This multilayer ceramic capacitor 20 has a capacitor body 21 of roughly rectangular solid shape, as well as a first external electrode 22 and a second external electrode 23, respectively provided at the two length-direction ends of the capacitor body 21.

Figure 5A:
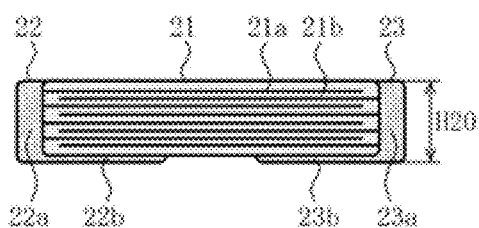
FIG. 5A is a cross sectional view of FIG. 4A along line S21-S21.

The capacitor body 21 has a capacitive part (not accompanied by symbol) constituted by multiple internal electrode layers 21$a$ that are stacked on with dielectric layers 21$b$ in between, as well as dielectric margin parts (not accompanied by symbol) covering both width-direction ends, and both height-direction ends, of the capacitive part. The multiple internal electrode layers 21$a$ have roughly the same rectangular external shape and roughly the same thickness, and their edges are connected alternately to a first part 22$a$ of the first external electrode 22, and a second part 23$a$ of the second external electrode 23, in the height direction. It should be noted that, while a total of eight internal electrode layers 21$a$ are shown in FIGS. 5A to 5C for the purpose of illustration, the number of internal electrode layers 21$a$ is not limited in any way.

The primary component of the capacitor body 21, except for the internal electrode layers 21$a$, is barium titanate, strontium titanate, calcium titanate, magnesium titanate, calcium zirconate, calcium zirconate titanate, barium zirconate, titanium oxide, or other dielectric material (dielectric ceramic material), for example. On the other hand, the primary component of each internal electrode layer 21$a$ is nickel, copper, palladium, platinum, silver, gold, or alloy thereof, or other metal material, for example.

The first external electrode 22 is embodied as a continuous unit whose first part 22$a$ is attached to one length-direction face (left face in FIG. 5A), and whose second part 22$b$ is attached to one height-direction face (bottom face in FIG. 5A), of the capacitor body 21. The second external electrode 23 is embodied as a continuous unit whose first part 23$a$ is attached to the other length-direction face (right face in FIG. 5A), and whose second part 23$b$ is attached to one height-direction face (bottom face in FIG. 5A), of the capacitor body 21. As is evident from FIG. 5A, the thickness of the second part 22$b$ of the first external electrode 22 is smaller than the thickness of the first part 22$a$, while the thickness of the second part 23$b$ of the second external electrode 23 is smaller than the thickness of the first part 23$a$, in order to make the height H20 of the multilayer ceramic capacitor 20 small.

Figure 5B:
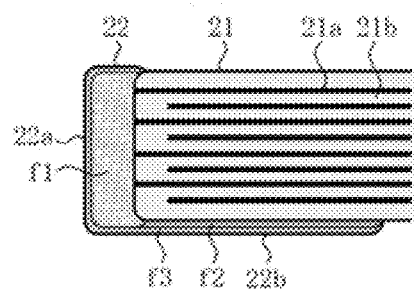
FIG. 5B is an enlarged view showing key parts of FIG. 5A.
Figure 5C:
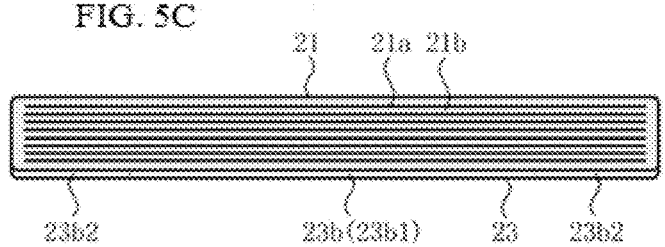
FIG. 5C is a cross sectional view of FIG. 4A along line S22-S22.

When the layer structure of the first external electrode 22 and second external electrode 23 is described in detail using FIG. 5B, each external electrode 22 or 23 has a first base film f1 contacting both one length-direction face and the other length-direction face of the capacitor body 21, a second base film f2 contacting one height-direction face of the capacitor body 21 and the first base film f1, and a surface film f3 contacting the exterior face of the first base film f1 and that of the second base film f2.

The primary component of the first base film f1 is nickel, copper, palladium, platinum, silver, gold, or alloy thereof, or other metal material, for example, and preferably this is a baked film. The primary component of the second base film f2 is copper, nickel, platinum, palladium, gold, or alloy thereof, or other metal material, for example, and preferably this is a baked film or dry plating film. The primary component of the surface film f3 is copper, nickel, tin, palladium, gold, zinc, or alloy thereof, for example, and preferably this is a wet plating film or dry plating film. It should be noted that the surface film f3 may have a three-layer structure or two-layer structure, and if it has a three-layer structure, preferably a copper film, a nickel film, and a tin film, are formed in this order according to the wet plating method on the exterior face of both base films f1, f2, for example. If it has a two-layer structure, on the other hand, preferably a nickel film and a tin film are formed in this order according to the wet plating method on the exterior face of both base films f1, f2, for example.

Figure 4A:
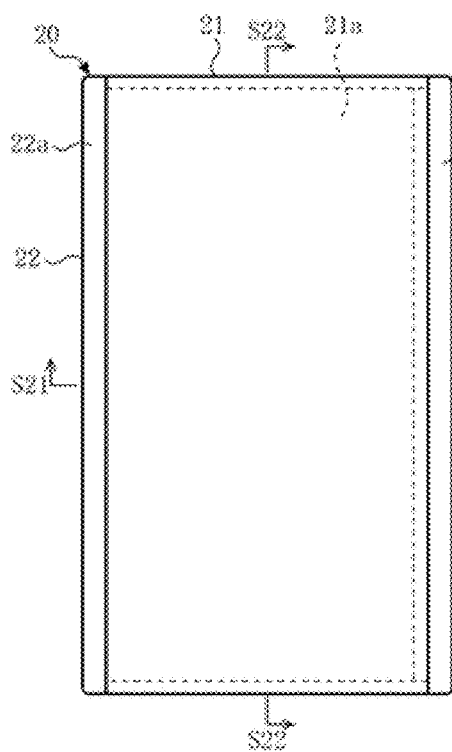
FIG. 4A is a plan view of a multilayer ceramic capacitor to which the present invention is applied.
Figure 4B:
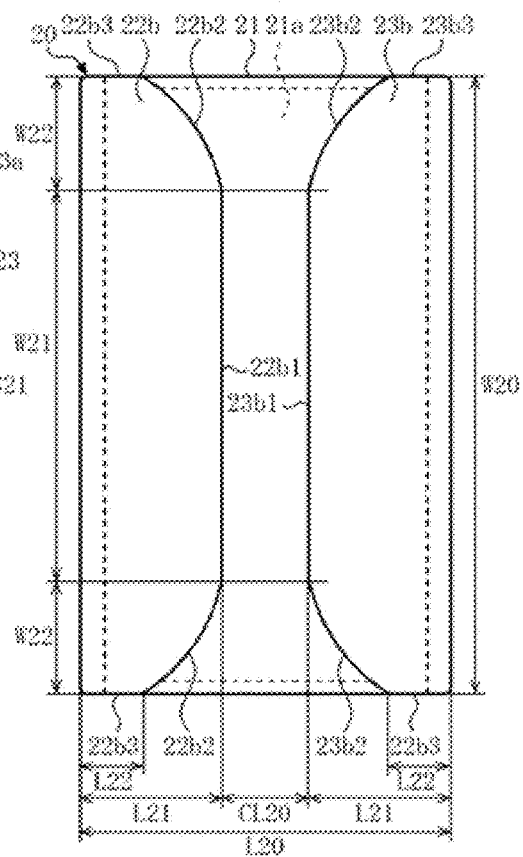
FIG. 4B is a bottom view of the multilayer ceramic capacitor shown in FIG. 4A.

Now, the external shapes (contours) of the second parts 22b, 23b of the external electrodes 22, 23 is described in detail using FIG. 4B. When the multilayer ceramic capacitor 20 is viewed from one height-direction face, the external shape (contour) of each of the second parts 22b, 23b is roughly hexagonal. The second parts 22b, 23b respectively have, each as a continuous unit, the width-direction center portions 22b1, 23b1 where the length L21 becomes the largest, and two width-direction ends 22b2, 23b2 whose lengths (not accompanied by symbol) gradually (or continuously) decrease to the width-direction edges 22b3, 23b3, respectively, positioned on both width-direction sides of the width-direction center portions 22b1, 23b1 where the length L22 becomes the smallest. The outer edges of the width-direction center portions 22b1, 23b1 are each constituted by a straight line. Here, the term "straight line" includes a perfectly straight line, a line that undulates somewhat but is still considered straight as a whole, or the like. The outer edges of the width-direction ends 22b2, 23b2 are each constituted by a curved line that bulges toward the length-direction center of the multilayer ceramic capacitor 20. Here, the term "curved line" includes a curved line not having a single radius of curvature, a curved line having a single radius of curvature, or a line that does not curve uniformly but is considered curved as a whole, or the like.

Also, the length-direction clearance CL20 between the width-direction center portions 22b1, 23b1 of the second parts 22b, 23b is smaller than the length L21 of each width-direction center portion 22b1 or 23b1. Furthermore, the widths W21 of the width-direction center portions 22b1, 23b1 of the second parts 22b, 23b are each preferably equal to or greater than one-third the width W20 of the multilayer ceramic capacitor 20, or more preferably equal to or greater than one-third, but not exceeding eleven-twelfths, the width W20 of the multilayer ceramic capacitor 20. Furthermore, the lengths L22 of the width-direction edges 22b3, 23b3 of the second parts 22b, 23b are each preferably equal to or less than two-thirds the length L21 of each width-direction center portion 22b1 or 23b1, and more preferably equal to or greater than one-eighth, but not exceeding two-thirds, the length L21 of each width-direction center portion 22b1 or 23b1.

It should be noted that, since the multilayer ceramic capacitor 20 shown in FIGS. 4A to 5C is drawn based on one prototype, each dimension of this prototype is presented below for a better understanding of the external shapes of the second parts 22b, 23b of the external electrodes 22, 23.

The length L20, width W20, and height H20 of the prototype (multilayer ceramic capacitor) are 600 μm, 1000 μm, and 125 μm, respectively. As for the dimensions relating to the external shapes of the second parts 22b, 23b of the external electrodes 22, 23, the lengths L21 of the width-direction center portions 22b1, 23b1 are each 230 μm, the lengths L22 of the width-direction edges 22b3, 23b3 are each 100 μm, the widths W21 of the width-direction center portions 22b1, 23b1 are each 640 μm, and the width W22 of each width-direction end 22 is 180 μm. Also, the length-direction clearance CL20 between the second parts 22b, 23b of the external electrodes 22, 23 is 140 μm. Furthermore, the first parts 22a, 23a and second parts 22b, 23b of the external electrodes 22, 23 have a thickness of 40 μm and that of 10 μm, respectively.

Next, an example of how the multilayer ceramic capacitor 20 shown in FIGS. 4A to 5C is manufactured is explained. The manufacturing example explained here is only one example and does not limit in any way the method for manufacturing the multilayer ceramic capacitor 20 shown in FIGS. 4A to 5C.

If the primary component of the capacitor body 21 except for the internal electrode layers 21a is barium titanate, the primary component of the internal electrode layers 21a is nickel, and, for the external electrodes 22, 23, the primary component of the first base film f1 is nickel, the primary component of the second base film f2 is nickel, and the primary component of the surface film f3 is tin, then a ceramic slurry containing barium titanate powder, organic solvent, organic binder, dispersant, etc., an internal electrode paste containing nickel powder, organic solvent, organic binder, dispersant, etc., and an external electrode paste containing nickel powder, barium titanate powder (common materials), organic solvent, organic binder, dispersant, etc., are prepared.

Next, the ceramic slurry is coated on the surface of a carrier film and then dried, to produce a first sheet. Also, the internal electrode paste is printed on the surface of the first sheet, and then dried, to produce a second sheet on which internal electrode layer patterns have been formed.

Next, a specified number of unit sheets taken from the first sheet are stacked and thermally compressed one by one, to form an area corresponding to one height-direction dielectric margin part. Next, a specified number of unit sheets (including internal electrode layer patterns) taken from the second sheet are stacked and thermally compressed one by one, to form an area corresponding to the capacitive part. Next, a specified number of unit sheets taken from the first sheet are stacked and thermally compressed one by one, to form an area corresponding to the other height-direction dielectric margin part. Finally, the entire stack is thermally compressed for one last time to produce an unsintered multilayer sheet.

Next, the unsintered multilayer sheet is cut to a grid to produce unsintered capacitor bodies, each corresponding to the capacitor body 21. Next, the external electrode paste is dip-coated, roller-coated, or otherwise applied on both length-direction end faces of the unsintered capacitor body, and then dried, to produce an unsintered first base film. Next, the external electrode paste is roller-coated, printed, or otherwise applied on both ends of one height-direction face of the unsintered capacitor body on which the unsintered first base film has been formed, and then dried, to produce an unsintered second base film.

Next, the many unsintered capacitor bodies on which the unsintered first base film and unsintered second base film have been formed, are put in a sintering furnace and sintered (the process includes both binder removal and sintering) all at once in a reducing atmosphere and according to a temperature profile appropriate for barium titanate and nickel, to produce capacitor bodies, each having the first base film (nickel; refer to f1 in FIG. 5B) and second base film (nickel; refer to f2 in FIG. 5B) for each external electrode. Next, on the capacitor body on which the first base film and second base film have been formed, a surface film (tin; refer to f3 in FIG. 5B) for each external electrode is produced on the exterior faces of the first base film and second base film by means of electroplating.

It should be noted that the first base film (refer to f1 in FIG. 5B) and second base film (refer to f2 in FIG. 5B) for each external electrode may be produced by applying the external electrode paste on the capacitor body obtained by sintering the unsintered capacitor body, drying the paste, and then baking the capacitor body. It should be noted that, as described earlier, the primary component of the capacitor body 21 except for the internal electrode layers 21*a* may be any dielectric material other than barium titanate, the primary component of the internal electrode layers 21*a* may be any metal material other than nickel, and, for the external electrodes 22, 23, the primary component of the first base film f1 may be any metal material other than nickel, the primary component of the second base film f2 may be any metal material other than nickel, and the primary component of the surface film f3 may be any metal material other than tin, where the surface film f3 may have a three-layer structure or two-layer structure.

Figure 2:
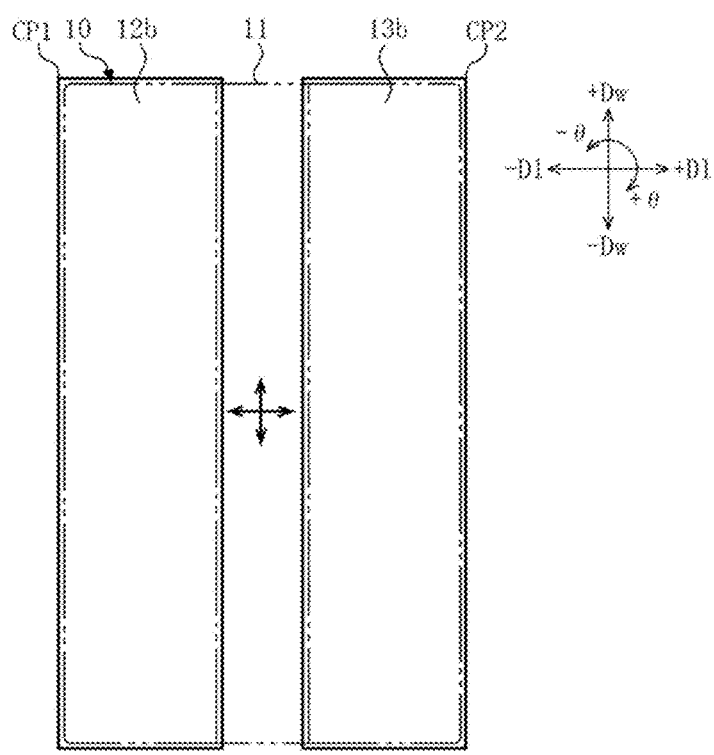
FIG. 2 is a drawing illustrating a first condition in which the multilayer ceramic capacitor shown in FIGS. 1A to 1C is mounted on a circuit board.
Figure 6:
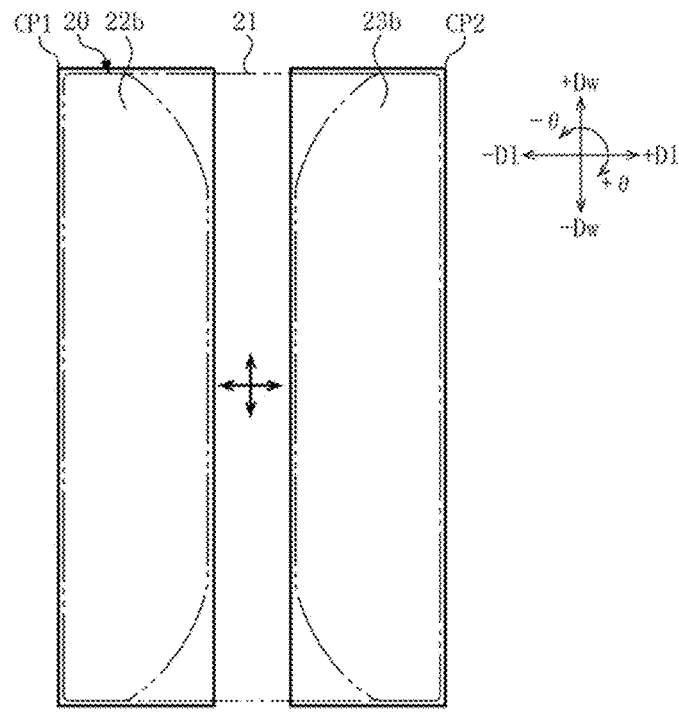
FIG. 6 is a drawing illustrating a first condition in which the multilayer ceramic capacitor shown in FIGS. 4A and 4B is mounted on a circuit board.
Figure 7:
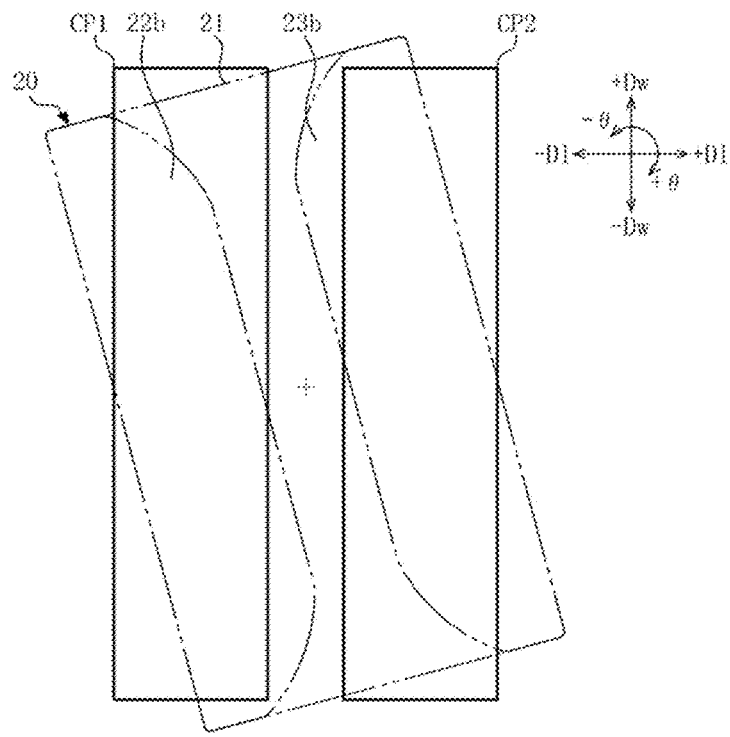
FIG. 7 is a drawing illustrating a second condition in which the multilayer ceramic capacitor shown in FIGS. 4A and 4B is mounted on a circuit board.

Next, the condition in which the multilayer ceramic capacitor 20 shown in FIGS. 4A to 5C is mounted on a circuit board is explained using FIGS. 6 and 7. In FIGS. 6 and 7, CP1 represents a first conductor pad of roughly rectangular shape corresponding to the second part 22*b* of the first external electrode 22, while CP2 represents a second conductor pad of roughly rectangular shape corresponding to the second part 23*b* of the second external electrode 23. These conductor pads CP1, CP2 are the same as those described in FIGS. 2 and 3. To be specific, the length and width of the first conductor pad CP1 are roughly the same as the length L21 and width W20 of the second part 22*b* of the first external electrode 22 (refer to FIG. 4B), respectively, while the length and width of the second conductor pad CP2 are roughly the same as the length L21 and width W20 of the second part 23*b* of the second external electrode 23 (refer to FIG. 4B), respectively.

When the multilayer ceramic capacitor 20 shown in FIGS. 4A to 5C is mounted on a circuit board, cream solder or other creamy bonding material is first applied on the surface of the first conductor pad CP1, and on the surface of the second conductor pad CP2. Next, the multilayer ceramic capacitor 20 is placed on the circuit board in such a way that both the second part 22*b* of the first external electrode 22, and the second part 23*b* of the second external electrode 23, contact the creamy bonding material that has been applied. Next, the circuit board on which the multilayer ceramic capacitor 20 has been placed is put in a reflow oven to bond primarily the second part 22*b* of the first external electrode 22 to the first conductor pad CP1, and bond primarily the second part 23*b* of the second external electrode 23 to the second conductor pad CP2.

Even if, in the aforementioned placement step, the multilayer ceramic capacitor 20 shifts somewhat in the length direction (refer to +D1 and −D1 in FIG. 6) or width direction (refer to +Dw and −Dw in FIG. 6) from an ideal position, the self-alignment effect (by solder unless solder flux is degraded) in the aforementioned bonding step will cause the multilayer ceramic capacitor 20 to move appropriately in the direction of the arrow shown at the center of FIG. 6, and its position will be automatically corrected to the proper position shown in FIG. 6.

Incidentally, the multilayer ceramic capacitor 20 may shift in the rotational direction (refer to +θ and −θ in FIG. 7) from an ideal position in the placement step, as shown in FIG. 7. Such rotational shift may be caused by, for example, vibration applied to the multilayer ceramic capacitor 20 in the transfer process after the multilayer ceramic capacitor 20 has been picked up with a pickup nozzle for placement, or sliding of the multilayer ceramic capacitor 20 against a pickup nozzle for placement in a state where the multilayer ceramic capacitor 20 is picked up on the pickup nozzle, or surface irregularity in the area of the multilayer ceramic capacitor 20 where the multilayer ceramic capacitor 20 is picked up with a pickup nozzle for placement, for example.

With the multilayer ceramic capacitor 20 shown in FIGS. 4A to 5C, however, the external shape of the second part 22*b* of the first external electrode 22 and that of the second part 23*b* of the second external electrode 23 are such that the lengths L21 of the width-direction center portions 22*b*1, 23*b*1 are the largest, while the lengths L22 of the width-direction edges 22*b*3, 23*b*3 are the smallest, with the lengths gradually decreasing from the width-direction center portions 22*b*1, 23*b*1 to the width-direction edges 22*b*3, 23*b*3, respectively. This means that, even if the multilayer ceramic capacitor 20 undergoes a rotational shift (in FIG. 7, this rotational shift is approx. 15 degrees, which is the same as the rotational shift shown in FIG. 3) in the placement step, the second part 22*b* of the first external electrode 22 on the multilayer ceramic capacitor 20 will not contact the second conductor pad CP2, as shown in FIG. 7.

Figure 3:
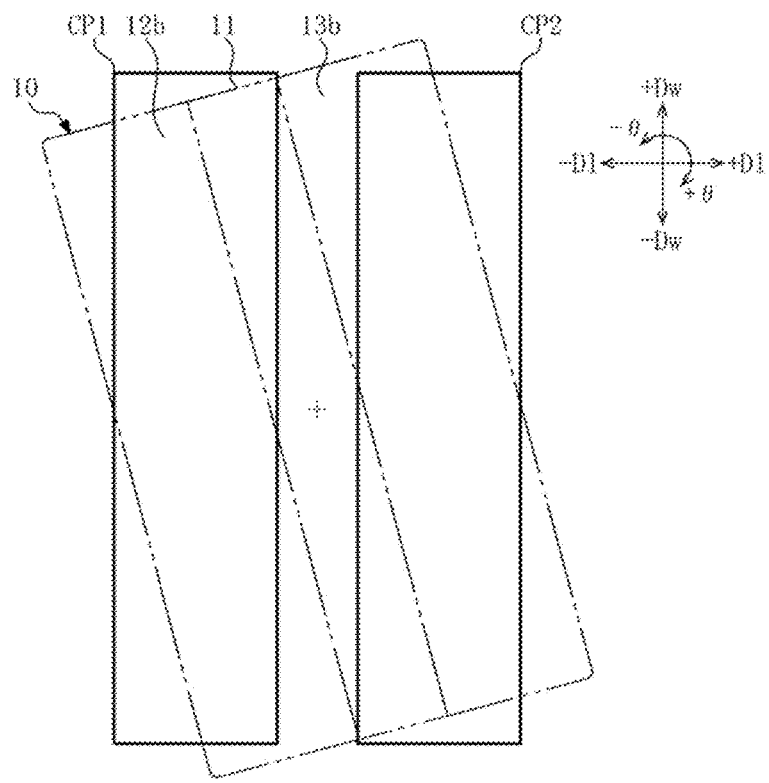
FIG. 3 is a drawing illustrating a second condition in which the multilayer ceramic capacitor shown in FIGS. 1A to 1C is mounted on a circuit board.

In other words, the multilayer ceramic capacitor 20 will not cause a mounting failure even if it undergoes a rotational shift, in the placement step, by the same angle as that of the rotational shift of the multilayer ceramic capacitor 10 as shown in FIG. 3. In addition, even if the multilayer ceramic capacitor 20 undergoes a rotational shift as shown in FIG. 7, this rotational shift can be corrected by the self-alignment effect in the bonding step.

Next, the effects achieved by the multilayer ceramic capacitor 20 shown in FIGS. 4A to 5C are explained.

With the multilayer ceramic capacitor 20 shown in FIGS. 4A to 5C, the external shape of the second part 22*b* of the first external electrode 22 and that of the second part 23*b* of the second external electrode 23 are such that the lengths L21 of the width-direction center portions 22*b*1, 23*b*1 are the largest, while the lengths L22 of the width-direction edges 22*b*3, 23*b*3 are the smallest, with the lengths gradually decreasing from the width-direction center portions 22*b*1, 23*b*1 to the width-direction edges 22*b*3, 23*b*3, respectively. In other words, the multilayer ceramic capacitor 20 has a greater allowance, than the multilayer ceramic capacitor 10 shown in FIGS. 1A to 1C, for any rotational shift that may occur at the time of placement on a circuit board, and therefore the probability of the multilayer ceramic capacitor 20 causing a mounting failure due to a rotational shift as it is placed on a circuit board, can be reduced.

Also, with the multilayer ceramic capacitor 20 shown in FIGS. 4A to 5C, the length-direction clearance CL20 between the width-direction center portions 22*b*1, 23*b*1 of the second part 22*b* of the first external electrode 22 and the second part 23*b* of the second external electrode 23, is smaller than the length L21 of each width-direction center portion 22*b*1 or 23*b*1. This means that, even when the height H20 of the multilayer ceramic capacitor 20 is made smaller or its mass is reduced, the startup phenomenon is still unlikely to occur when the multilayer ceramic capacitor 20 is mounted on a circuit board.

Furthermore, with the multilayer ceramic capacitor 20 shown in FIGS. 4A to 5C, the widths W21 of the width-direction center portions 22*b*1, 23*b*1 of the second part 22*b* of the first external electrode 22 and the second part 23*b* of the second external electrode 23 are each equal to or greater than one-third the width W20 of the multilayer ceramic capacitor 20. In other words, any reduction in the area of the second part 22*b* of the first external electrode 22, or in the area of the second part 23*b* of the second external electrode 23, can be minimized so that, when the multilayer ceramic capacitor 20 is mounted, any drop in the adhesive strengths at the connections can be minimized. It should be noted that drop in the breaking strength of the multilayer ceramic capacitor 20 can be suppressed by setting the width of each internal electrode layer 21*a* greater than the width W21 of each width-direction center portion 22*b*1 or 23*b*1.

Furthermore, with the multilayer ceramic capacitor 20 shown in FIGS. 4A to 5C, the lengths L22 at the width-direction edges 22*b*3, 23*b*3 of the second part 22*b* of the first external electrode 22 and the second part 23*b* of the second external electrode 23 are each equal to or less than two-thirds the lengths L21 of the width-direction center portions 22*b*1, 23*b*1 of the second part 22*b* of the first external electrode 22 and the second part 23*b* of the second external electrode 23. This increases the allowance for rotational shift at the time of placement on a circuit board, to further reduce the probability of the multilayer ceramic capacitor 20 causing a mounting failure due to a rotational shift as it is placed on a circuit board.

Next, first through eleventh variation examples of the multilayer ceramic capacitor 20 shown in FIGS. 4A to 5C are explained one by one using FIGS. 8A through 14C. It goes without saying that effects similar to the foregoing can still be achieved by adopting these first through eleventh variation examples.

First Variation Example

Figure 8A:
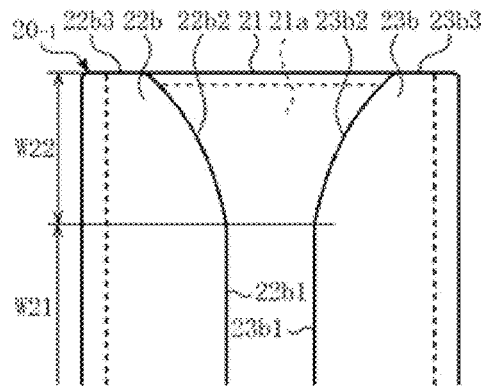
FIG. 8A is a drawing corresponding to FIG. 4B that illustrates a first variation example of the multilayer ceramic capacitor shown in FIGS. 4A and 4B.

The first variation example shown in FIG. 8A is such that the widths W22 of the width-direction ends 22*b*2, 23*b*2 of the second part 22*b* of the first external electrode 22 and the second part 23*b* of the second external electrode 23 are each made larger than the width W22 shown in FIG. 4B.

Second Variation Example

Figure 8B:
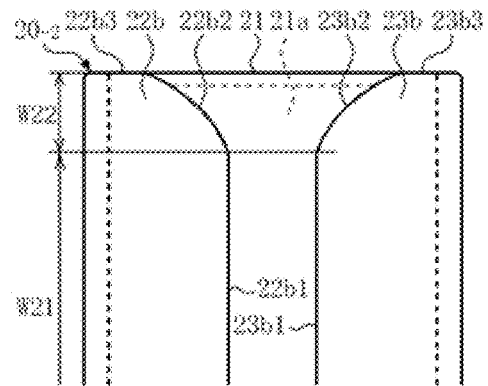
FIG. 8B is a drawing corresponding to FIG. 4B that illustrates a second variation example of the multilayer ceramic capacitor shown in FIGS. 4A and 4B.

The second variation example shown in FIG. 8B is such that the widths W22 of the width-direction ends 22*b*2, 23*b*2 of the second part 22*b* of the first external electrode 22 and the second part 23*b* of the second external electrode 23 are each made smaller than the width W22 shown in FIG. 4B.

Third Variation Example

Figure 9A:
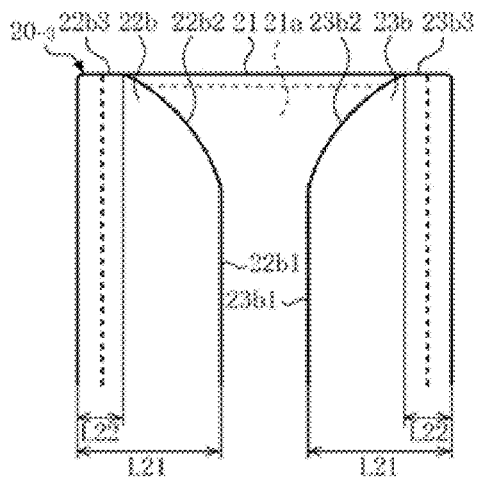
FIG. 9A is a drawing corresponding to FIG. 4B that illustrates a third variation example of the multilayer ceramic capacitor shown in FIGS. 4A and 4B.

The third variation example shown in FIG. 9A is such that the lengths L22 of the width-direction edges 22*b*3, 23*b*3 of the second part 22*b* of the first external electrode 22 and the second part 23*b* of the second external electrode 23 are each made smaller than the length L22 shown in FIG. 4B.

Fourth Variation Example

Figure 9B:
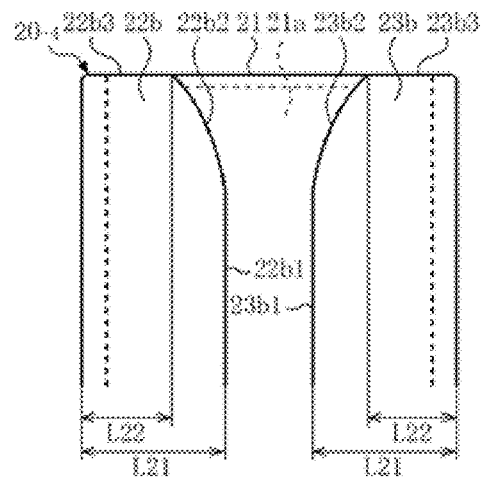
FIG. 9B is a drawing corresponding to FIG. 4B that illustrates a fourth variation example of the multilayer ceramic capacitor shown in FIGS. 4A and 4B.

The fourth variation example shown in FIG. 9B is such that the lengths L22 of the width-direction edges 22*b*3, 23*b*3 of the second part 22*b* of the first external electrode 22 and the second part 23*b* of the second external electrode 23 are each made larger than the length L22 shown in FIG. 4B.

Fifth Variation Example

Figure 10:
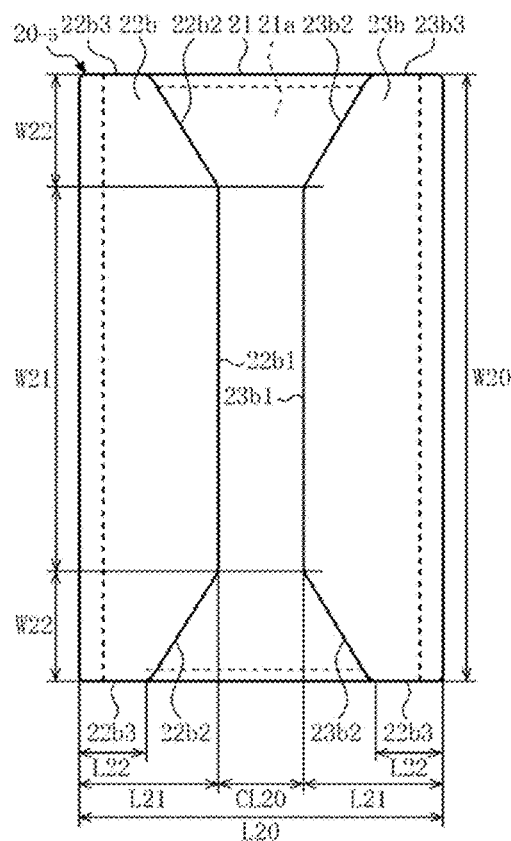
FIG. 10 is a drawing corresponding to FIG. 4B that illustrates a fifth variation example of the multilayer ceramic capacitor shown in FIGS. 4A and 4B.

The fifth variation example shown in FIG. 10 is such that the outer edges of the width-direction ends 22*b*2, 23*b*2 of the second part 22*b* of the first external electrode 22 and the second part 23*b* of the second external electrode 23 shown in FIG. 4B are each constituted by a straight line. The term "straight line" includes a perfectly straight line, a line that undulates somewhat but is still considered straight as a whole, or the like.

Sixth Variation Example

Figure 11A:
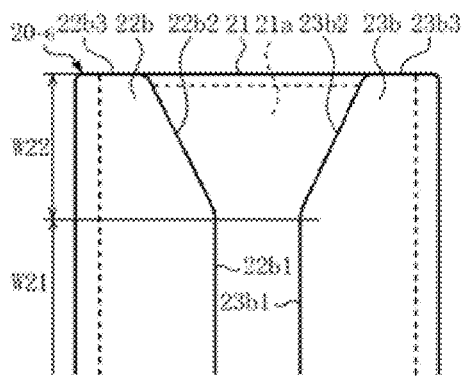
FIG. 11A is a drawing corresponding to FIG. 4B that illustrates a sixth variation example of the multilayer ceramic capacitor shown in FIGS. 4A and 4B.

The sixth variation example shown in FIG. 11A is such that the widths W22 at the width-direction ends 22*b*2, 23*b*2 of the second part 22*b* of the first external electrode 22 and the second part 23*b* of the second external electrode 23 are each made larger than the width W22 shown in FIG. 10.

Seventh Variation Example

Figure 11B:
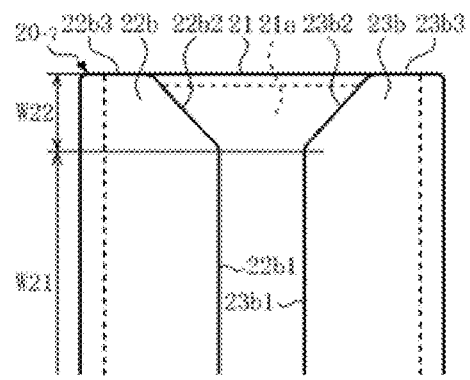
FIG. 11B is a drawing corresponding to FIG. 4B that illustrates a seventh variation example of the multilayer ceramic capacitor shown in FIGS. 4A and 4B.

The seventh variation example shown in FIG. 11B is such that the widths W22 at the width-direction ends 22*b*2, 23*b*2 of the second part 22*b* of the first external electrode 22 and the second part 23*b* of the second external electrode 23 are each made smaller than the width W22 shown in FIG. 10.

Eighth Variation Example

Figure 12A:
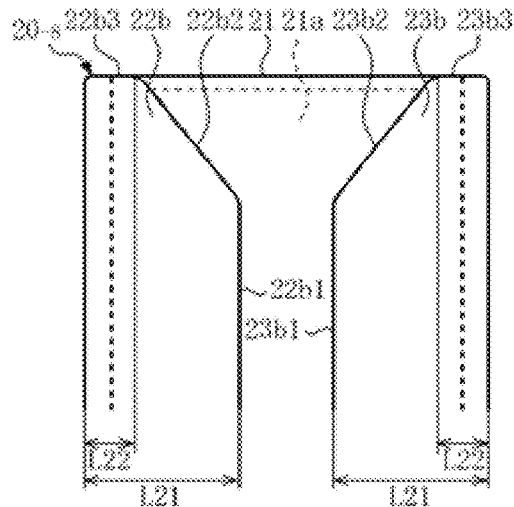
FIG. 12A is a drawing corresponding to FIG. 4B that illustrates an eighth variation example of the multilayer ceramic capacitor shown in FIGS. 4A and 4B.

The eighth variation example shown in FIG. 12A is such that the lengths L22 at the width-direction edges 22*b*3, 23*b*3 of the second part 22*b* of the first external electrode 22 and the second part 23*b* of the second external electrode 23 are each made smaller than the length L22 shown in FIG. 10.

Ninth Variation Example

Figure 12B:
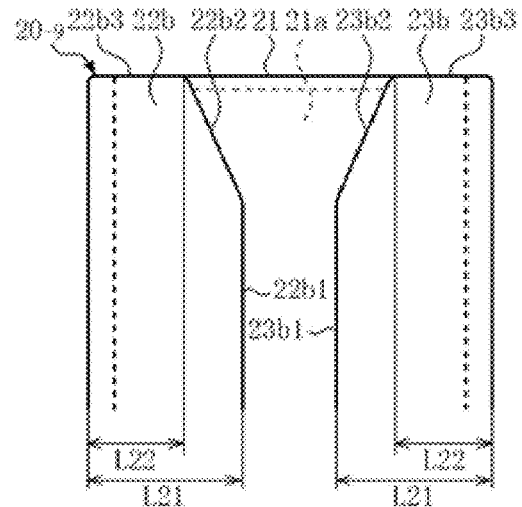
FIG. 12B is a drawing corresponding to FIG. 4B that illustrates a ninth variation example of the multilayer ceramic capacitor shown in FIGS. 4A and 4B.

The ninth variation example shown in FIG. 12B is such that the lengths L22 at the width-direction edges 22*b*3, 23*b*3 of the second part 22*b* of the first external electrode 22 and the second part 23*b* of the second external electrode 23 are each made larger than the length L22 shown in FIG. 10.

Tenth Variation Example

Figure 13A:
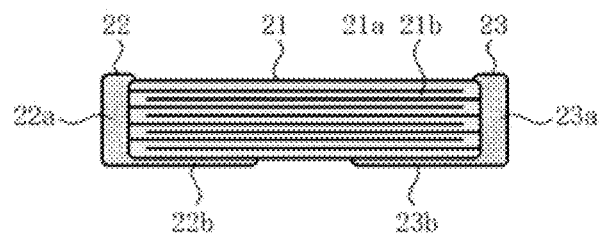
FIG. 13A is a drawing corresponding to FIG. 5A that illustrates a tenth variation example of the multilayer ceramic capacitor shown in FIGS. 4A and 4B.
Figure 13B:
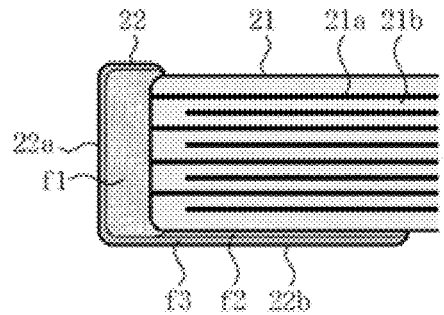
FIG. 13B is an enlarged view showing key parts of FIG. 13A.

The tenth variation example shown in FIGS. 13A and 13B is such that, compared to the first external electrode 22 and second external electrode 23 shown in FIG. 5A, the first part 22*a* of the first external electrode 22 and the first part 23*a* of the second external electrode 23 each project beyond the other height-direction face (top face in FIG. 13A) of the capacitor body 21. Here, the layer structure of the first external electrode 22 and that of the second external electrode 23 are as shown in FIG. 13B. In other words, the first base film f1 is formed in such a way that, while contacting both one length-direction face and the other length-direction face of the capacitor body 21, its two height-direction ends project beyond one height-direction face and the other height-direction face (bottom face and top face in FIG. 13A) of the capacitor body 21. The second base film f2 is formed in such a way that it contacts one height-direction face of the capacitor body 21 and the first base film f1. The surface film f3 is formed in such a way that it contacts the exterior face of the first base film f1 and that of the second base film f2. It should be noted that the areas of the films projecting beyond the first parts 22*a*, 23*a* of the external electrodes 22, 23 may be extended in the length direction so that they wrap around the corners onto the other height-direction face (top face in FIG. 13A) of the capacitor body 21. Also, as described earlier, the surface films f3 of the external electrodes 22, 23 may have a three-layer structure or two-layer structure.

Eleventh Variation Example

Figure 14A:
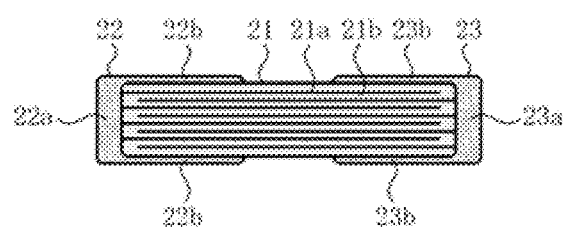
FIG. 14A is a drawing corresponding to FIG. 5A that illustrates an eleventh variation example of the multilayer ceramic capacitor shown in FIGS. 4A and 4B.
Figure 14B:
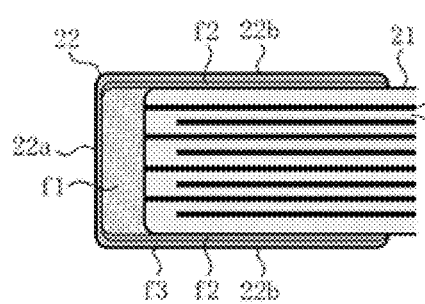
FIG. 14B is a first enlarged view showing key parts of FIG. 14A.
Figure 14C:
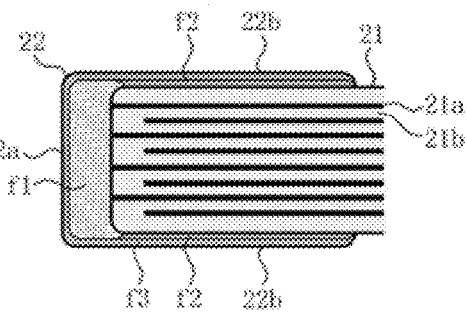
FIG. 14C is a second enlarged view showing key parts of FIG. 14A.

The eleventh variation example shown in FIGS. 14A to 14C is such that, compared to the first external electrode 22 and second external electrode 23 shown in FIG. 5A, the first external electrode 22 is embodied as a continuous unit whose first part 22a is attached to one length-direction face (left face in FIG. 14A), whose second part 22b is attached to one height-direction face (bottom face in FIG. 14A), and whose other second part 22b is attached to the other height-direction face (top face in FIG. 14A), of the capacitor body 21, and similarly, the second external electrode 23 is embodied as a continuous unit whose first part 23a is attached to the other length-direction face (right face in FIG. 14A), whose second part 23b is attached to one height-direction face (bottom face in FIG. 14A), and whose other second part 23b is attached to the other height-direction face (top face in FIG. 14A), of the capacitor body 21. In other words, the first external electrode 22 has two second parts 22b, while the second external electrode 23 has two second parts 23b.

Here, the layer structure of the first external electrode 22 and that of the second external electrode 23 are as shown in FIG. 14B or FIG. 14C. Specifically, in FIG. 14B, the first base film f1 is formed in such a way that it does not project beyond one height-direction face and the other height-direction face (bottom face and top face in FIG. 14A) of the capacitor body 21, one second base film f2 is formed in such a way that it contacts one height-direction face of the capacitor body 21 and one height-direction face (bottom face in FIG. 14B) of the first base film f1, the other second base film f2 is formed in such a way that it contacts the other height-direction face of the capacitor body 21 and the other height-direction face (top face in FIG. 14B) of the first base film f1, and the surface film f3 is formed in such a way that it contacts the exterior face of the first base film f1 and the exterior faces of the two second base films f2. It should be noted that, as far as the lengths of the first parts 22a, 23a of the external electrodes 22, 23 are concerned, one length may be smaller than the other length. Also, as described earlier, the surface films f3 of the external electrodes 22, 23 may have a three-layer structure or two-layer structure.

Also, in FIG. 14C, the first base film f1 is formed in such a way that it projects beyond one height-direction face and the other height-direction face (bottom face and top face in FIG. 14A) of the capacitor body 21, one second base film f2 is formed in such a way that it contacts one height-direction face of the capacitor body 21 and the first base film f1, the other second base film f2 is formed in such a way that it contacts the other height-direction face of the capacitor body 21 and the first base film f1, and the surface film f3 is formed in such a way that it contacts the exterior face of the first base film f1 and the exterior faces of the two second base films f2. It should be noted that, as far as the lengths of the first parts 22a, 23a of the external electrodes 22, 23 are concerned, one length may be smaller than the other length. Also, as described earlier, the surface films f3 of the external electrodes 22, 23 may have a three-layer structure or two-layer structure.

Other Variation Examples

While the multilayer ceramic capacitor 20 depicted in FIGS. 4A to 5C is based on one prototype whose length L20 is 600 μm, width W20 is 1000 μm and height H20 is 125 μm, the multilayer ceramic capacitor 20 can have a length L20 of 300 μm, width W20 of 600 μm, and height H20 of 125 μm, or the multilayer ceramic capacitor 20 can have a length L20 of 200 μm, width W20 of 400 μm, and height H20 of 125 μm, for example. In other words, the multilayer ceramic capacitor pertaining to the present invention is characterized by the external shape of the second part of each external electrode, and therefore the length, width, and height of the multilayer ceramic capacitor are not limited in any way.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-107068, filed May 30, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor satisfying the relationship of "width>length," while also having a first external electrode embodied as a continuous unit whose first part is attached to one length-direction face, and whose second part is attached to at least one height-direction face, of a capacitor body, as well as a second external electrode embodied as a continuous unit whose first part is attached to another length-direction face, and whose second part is attached to at least one height-direction face, of the capacitor body;

wherein, when a dimension along a length direction is denoted as length and a dimension along a width direction is denoted as width, then the second part of the first external electrode, and the second part of the second external electrode, each have an external shape whose length becomes a largest along a width-direction center portion and a smallest at each width-direction edge, and wherein each second part of the first and second external electrodes is roughly hexagonal as viewed from the one height-direction face, and the width-direction center portion of each second part is constituted by a straight line, wherein a width of the width-direction center portion of each second part is equal to or greater than one-third, but not exceeding eleven-twelfths, the width of the multilayer ceramic capacitor.

2. A multilayer ceramic capacitor according to claim 1, wherein the second part of the first external electrode, and the second part of the second external electrode, each have an external shape whose length continuously decreasing from the width-direction center portion to the width-direction edge.

3. A multilayer ceramic capacitor according to claim 1, wherein a length-direction clearance between the width-direction center portion of the second part of the first external electrode and that of the second part of the second external electrode is smaller than a length of the width-direction center portion of the second part of the first external electrode or that of the second part of the second external electrode.

4. A multilayer ceramic capacitor according to claim 2, wherein a length-direction clearance between the width-direction center portion of the second part of the first external electrode and that of the second part of the second external electrode is smaller than a length of the width-direction center portion of the second part of the first external electrode or that of the second part of the second external electrode.

5. A multilayer ceramic capacitor according to claim 1, wherein the width of the width-direction center portion of the second part of the first external electrode and that of the width-direction center portion of the second part of the second external electrode, are each equal to or greater than one-third the width of the multilayer ceramic capacitor.

6. A multilayer ceramic capacitor according to claim 2, wherein the width of the width-direction center portion of the second part of the first external electrode and that of the width-direction center portion of the second part of the second external electrode, are each equal to or greater than one-third the width of the multilayer ceramic capacitor.

7. A multilayer ceramic capacitor according to claim 3, wherein the width of the width-direction center portion of the second part of the first external electrode and that of the width-direction center portion of the second part of the second external electrode, are each equal to or greater than one-third the width of the multilayer ceramic capacitor.

8. A multilayer ceramic capacitor according to claim 4, wherein the width of the width-direction center portion of the second part of the first external electrode and that of the width-direction center portion of the second part of the second external electrode, are each equal to or greater than one-third the width of the multilayer ceramic capacitor.

9. A multilayer ceramic capacitor according to claim 1, wherein a width from each width-direction edge to an adjacent end of the straight line of each second part in the width direction is greater than a length of the width-direction edge of the second part in the length direction.

10. A multilayer ceramic capacitor according to claim 1, wherein a width from each width-direction edge to an adjacent end of the straight line of each second part in the width direction is smaller than a length of the width-direction edge of the second part in the length direction.

11. A multilayer ceramic capacitor satisfying the relationship of "width>length," while also having a first external electrode embodied as a continuous unit whose first part is attached to one length-direction face, and whose second part is attached to at least one height-direction face, of a capacitor body, as well as a second external electrode embodied as a continuous unit whose first part is attached to another length-direction face, and whose second part is attached to at least one height-direction face, of the capacitor body;
wherein, when a dimension along a length direction is denoted as length and a dimension along a width direction is denoted as width, then the second part of the first external electrode, and the second part of the second external electrode, each have an external shape whose length becomes a largest along a width-direction center portion and a smallest at each width-direction edge, and
wherein a length of the width-direction edge of the second part of the first external electrode and that of the second part of the second external electrode, are each equal to or less than two-thirds the length of the width-direction center portion of the second part of the first external electrode or that of the width-direction center portion of the second part of the second external electrode.

12. A multilayer ceramic capacitor according to claim 11, wherein the second part of the first external electrode, and the second part of the second external electrode, each have an external shape whose length continuously decreasing from the width-direction center portion to the width-direction edge.

13. A multilayer ceramic capacitor according to claim 11, wherein a length-direction clearance between the width-direction center portion of the second part of the first external electrode and that of the second part of the second external electrode is smaller than a length of the width-direction center portion of the second part of the first external electrode or that of the second part of the second external electrode.

14. A multilayer ceramic capacitor according to claim 12, wherein a length-direction clearance between the width-direction center portion of the second part of the first external electrode and that of the second part of the second external electrode is smaller than a length of the width-direction center portion of the second part of the first external electrode or that of the second part of the second external electrode.

15. A multilayer ceramic capacitor according to claim 11, wherein the width of the width-direction center portion of the second part of the first external electrode and that of the width-direction center portion of the second part of the second external electrode, are each equal to or greater than one-third the width of the multilayer ceramic capacitor.

16. A multilayer ceramic capacitor according to claim 12, wherein the width of the width-direction center portion of the second part of the first external electrode and that of the width-direction center portion of the second part of the second external electrode, are each equal to or greater than one-third the width of the multilayer ceramic capacitor.

17. A multilayer ceramic capacitor according to claim 12, wherein the width of the width-direction center portion of the second part of the first external electrode and that of the width-direction center portion of the second part of the second external electrode, are each equal to or greater than one-third the width of the multilayer ceramic capacitor.

18. A multilayer ceramic capacitor according to claim 14, wherein the width of the width-direction center portion of the second part of the first external electrode and that of the width-direction center portion of the second part of the second external electrode, are each equal to or greater than one-third the width of the multilayer ceramic capacitor.

* * * * *

UNITED STATES PATENT AND TRADEMARK OFFICE
CERTIFICATE OF CORRECTION

PATENT NO. : 10,199,170 B2
APPLICATION NO. : 15/605781
DATED : February 5, 2019
INVENTOR(S) : Takashi Sasaki, Toshiya Kuji and Shota Yajima Page 1 of 1

It is certified that error appears in the above-identified patent and that said Letters Patent is hereby corrected as shown below:

In the Claims

At Column 16, Line 48, in Claim 17, please delete "claim 12" and insert therefor --claim 13--.

Signed and Sealed this
Sixteenth Day of July, 2019

Andrei Iancu
*Director of the United States Patent and Trademark Office*